(12) United States Patent
Maro et al.

(10) Patent No.: US 8,027,519 B2
(45) Date of Patent: Sep. 27, 2011

(54) IMAGING MODULE FOR BIOMETRICS AUTHENTICATION, BIOMETRICS AUTHENTICATION APPARATUS AND PRISM

(75) Inventors: Tsuyoshi Maro, Ibaraki (JP); Akito Sakemoto, Ibaraki (JP); Akihiko Soya, Ina (JP); Takashi Sugiyama, Ina (JP); Masaki Yamazaki, Ina (JP)

(73) Assignee: Hitachi Maxwell, Ltd., Ibaraki-Shi, Osaka (JP)

( * ) Notice: Subject to any disclaimer, the term of this patent is extended or adjusted under 35 U.S.C. 154(b) by 957 days.

(21) Appl. No.: 11/955,114

(22) Filed: Dec. 12, 2007

(65) Prior Publication Data
US 2008/0175444 A1    Jul. 24, 2008

(30) Foreign Application Priority Data

Dec. 13, 2006  (JP) .................................. 2006-336204
Apr. 19, 2007  (JP) .................................. 2007-110945
Apr. 19, 2007  (JP) .................................. 2007-110960
Apr. 19, 2007  (JP) .................................. 2007-111015

(51) Int. Cl.
*G06K 9/00*    (2006.01)
(52) U.S. Cl. ........ 382/115; 382/116; 382/117; 382/124; 382/125; 382/127; 348/156; 348/161

(58) Field of Classification Search .................. 382/115, 382/116, 117, 124, 125, 127; 348/156, 161
See application file for complete search history.

(56) References Cited

U.S. PATENT DOCUMENTS 6,429,927 B1 *   8/2002  Borza ............................ 356/71
2004/0252867 A1 * 12/2004  Lan et al. ..................... 382/124

FOREIGN PATENT DOCUMENTS
JP    2006-198174 A    8/2006
* cited by examiner

*Primary Examiner* — Mike Rahmjoo
(74) *Attorney, Agent, or Firm* — Birch, Stewart, Kolasch & Birch, LLP

(57) ABSTRACT

An imaging module for biometrics authentication comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; and a camera module including a lens for focusing the light emerging from the outlet surface of the prism and an image pickup device for converting the light focused thereon by the lens into an electric signal and outputting the electric signal.

6 Claims, 13 Drawing Sheets

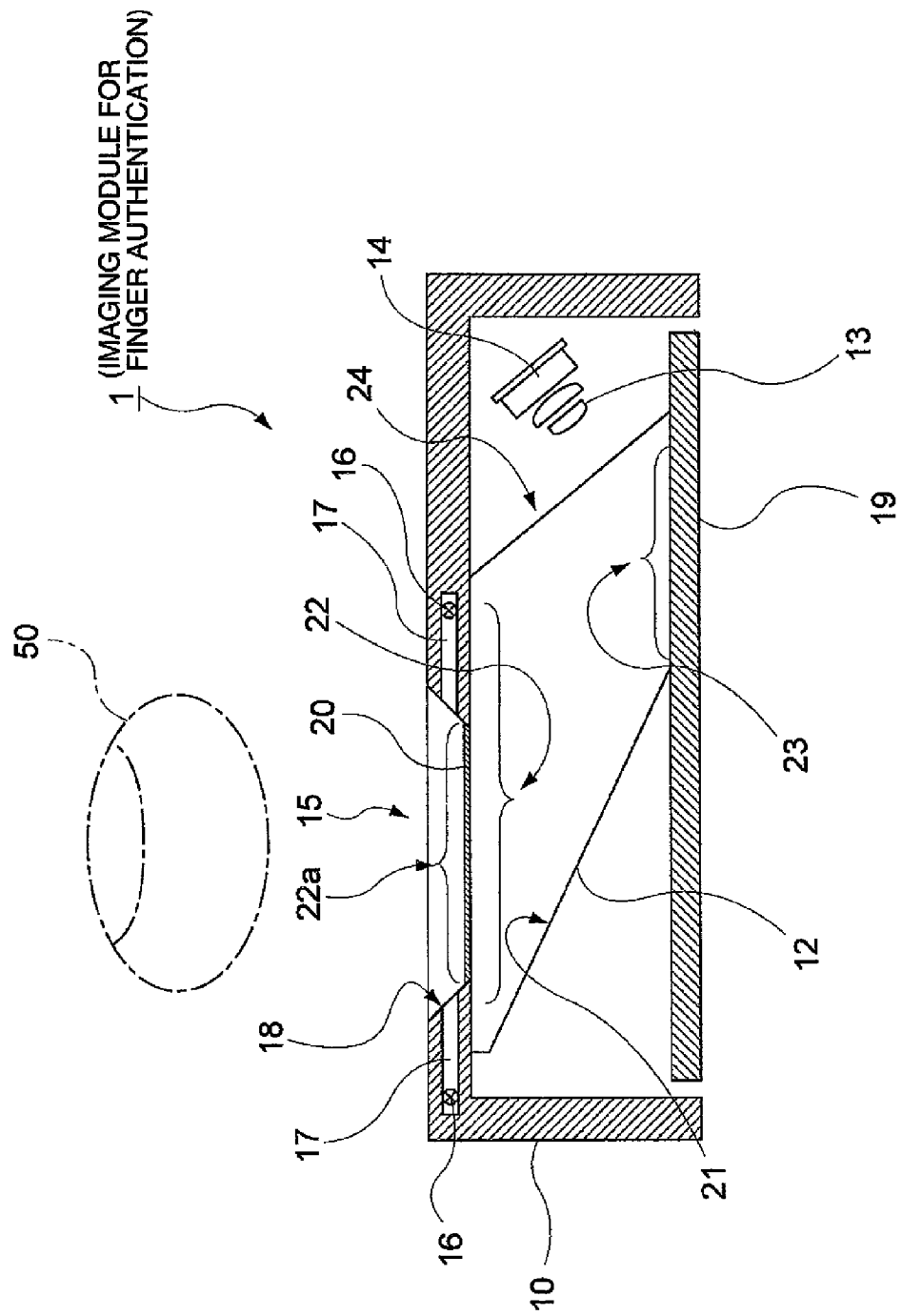

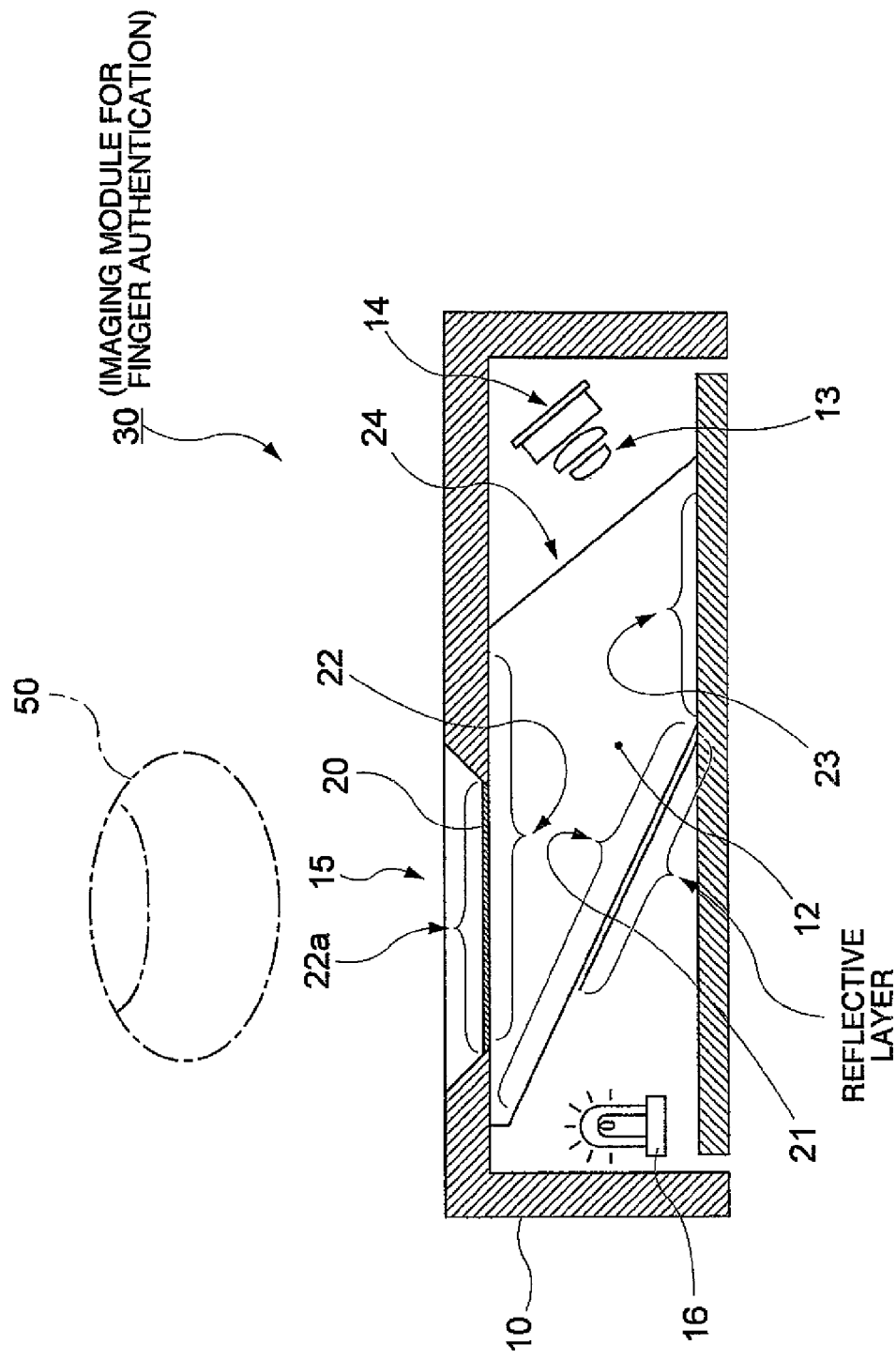

14    19    28

A-A CROSS SECTION 40 (IMAGING MODULE FOR FINGER AUTHENTICATION)

A-A CROSS SECTION

IMAGING MODULE FOR BIOMETRICS AUTHENTICATION, BIOMETRICS AUTHENTICATION APPARATUS AND PRISM

The present application claims priority from Japanese applications JP2006-336204 filed on Dec. 13, 2006, JP2007-110945 filed on Apr. 19, 2007, JP2007-111015 filed on Apr. 19, 2007 and JP2007-110960 filed on Apr. 19, 2007 the contents of which are hereby incorporated by reference into this application.

BACKGROUND OF THE INVENTION

The present invention relates to an imaging module for biometrics authentication, a biometrics authentication apparatus and a prism, and in particular, to an imaging module, etc. for biometrics authentication that are suitable for miniaturization and low-profiling.

In recent years, further miniaturization and low-profiling are commonly requested in applications area of personal devices such as cellular phones, PCs (Personal Computers) and PDAs (Personal Digital Assistants).

Meanwhile, in the field of such personal devices, security measures against unauthorized use of a device when the device is lost, stolen, etc. are greatly desired in these years. As one of the security measures, a technology applying biometrics authentication (using finger vein patterns, for example) to personal devices is being highly expected. The authentication using finger vein patterns is effective as biometrics authentication since the finger vein pattern differs from individual to individual. The finger vein authentication technology is especially advantageous in that the technology, which is generally not associated by people with criminal investigations differently from fingerprint authentication, does not cause psychological resistance and in that counterfeiting a finger vein pattern, not as information on the surface of a living body (which can be easily observed from outside) but as characteristics inside a living body, is difficult.

The finger vein authentication is performed by use of near-infrared rays, for example, since near-infrared rays are absorbed by hemoglobins contained in human blood while substantially penetrating other parts of a living body. In an image that is obtained by irradiating a finger (targeted part) of a person with near-infrared rays from outside and detecting light emerging from the finger (living body), muscular tissues and bones in the living body are described as white or bright parts, while blood vessels absorbing near-infrared rays are described as black or dark parts. A vein pattern is acquired based on the difference in the brightness, and the authentication of the person (personal authentication) is carried out by comparing the acquired vein pattern with vein patterns that have been registered previously.

In order to implement the vein authentication function in personal devices such as notebook PCs, an imaging module further miniaturized and low-profiled than conventional imaging modules is being desired to be developed.

Under such circumstances, a technique employed in JP-A-2006-198174 has been widely known as a technique for miniaturizing an imaging module for finger authentication.

The technique disclosed in JP-A-2006-198174 acquires information on a living body (a finger of a person) by irradiating lateral parts of the finger with near-infrared rays, deflecting the near-infrared rays emerging from the finger after traveling (being reflected and dispersed) inside the finger with a reflecting mirror, converting the deflected rays into an electric signal with a CCD (Charge-Coupled Device) sensor, and converting the electric signal into two-dimensional image data with an authentication unit.

SUMMARY OF THE INVENTION

However, even such an imaging module for finger authentication, reflecting (deflecting) the incident light with a mirror and capturing the reflected light, has not been miniaturized sufficiently.

It is therefore the primary object of the present invention to provide an imaging module for biometrics authentication realizing the miniaturization and low-profiling.

In order to achieve the above object, an imaging module for biometrics authentication in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; and a camera module including a lens for focusing the light emerging from the outlet surface of the prism and an image pickup device for converting the light focused thereon by the lens into an electric signal and outputting the electric signal.

Preferably, in the imaging module for biometrics authentication, the prism is configured so that the light taken in through the incidence area and reflected by a first reflecting surface is reflected by the incidence surface including the incidence area by using the incidence surface also as a second reflecting surface.

Preferably, in the imaging module for biometrics authentication, the prism is configured so that the light taken in through the incidence area and reflected by the first reflecting surface is reflected by total reflection in an area of the second reflecting surface including at least the incidence area.

Preferably, in the imaging module for biometrics authentication, an area of the second reflecting surface of the prism other than the incidence area is coated with a reflective layer for reflecting the light taken in through the incidence area and reflected by the first reflecting surface.

Preferably, in the imaging module for biometrics authentication, the prism is configured so that the light reflected by the second reflecting surface is reflected by a third reflecting surface placed opposite to the second reflecting surface and thereafter emerges from the prism through the outlet surface.

Preferably, in the imaging module for biometrics authentication, the first reflecting surface of the prism includes a total reflection area which reflects the light taken in through the incidence area by total reflection and a reflective layer formation area which reflects the light taken in through the incidence area by a reflective layer formed on the surface of the prism. The light source irradiates the living body with the light capable of passing through the living body via the total reflection area and the incidence area.

In order to achieve the above object, an imaging module for biometrics authentication in accordance with an aspect of the present invention is configured so that light emerging from a living body enters a prism through an incidence area of the prism, reflected inside the prism twice or more, and focused on an image pickup device. Reflecting surfaces of the prism are placed on optical paths connecting the incidence area and the image pickup device.

Preferably, the imaging module for biometrics authentication further comprises a filter which blocks visible light.

Preferably, in the imaging module for biometrics authentication, a Fresnel lens is formed on the filter.

In order to achieve the above object, a biometrics authentication apparatus in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; a recognition unit which recognizes a blood vessel pattern of the living body by analyzing the electric signal outputted by the image pickup device; a storage unit which prestores blood vessel patterns of living bodies; and an authentication unit which executes personal authentication by comparing the blood vessel pattern recognized by the recognition unit with the blood vessel patterns prestored in the storage unit.

Preferably, the imaging module further comprises a finger guide to be used for placing a finger as the living body at a prescribed position.

Preferably, in the imaging module, the finger guide has an irradiation window for the irradiation of the finger with the light emitted by the light source.

In order to achieve the above object, a prism in accordance with an aspect of the present invention comprises: an incidence surface including an incidence area for taking in light emerging from a living body; a first reflecting surface for reflecting the light taken in through the incidence surface; a second reflecting surface for reflecting the light reflected by the first reflecting surface while serving also as the incidence surface; and an outlet surface for outputting the light which has been taken in and reflected. The second reflecting surface includes a total reflection area which reflects the reflected light from the first reflecting surface by total reflection.

Conventional imaging modules for biometrics authentication further involve the following problem. Even though a conventional miniaturized and low-profiled imaging module for finger authentication was designed to prevent unnecessary light from entering the camera module by use of an optical aperture, the aperture function against a large amount of unnecessary light has not necessarily been sufficient due to the miniaturization of the camera module.

It is therefore another object of the present invention to provide an imaging module for biometrics authentication attaining stable imaging quality by eliminating the unnecessary light.

In order to achieve the above object, an imaging module for biometrics authentication in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; and a housing which places the prism and the camera module at prescribed positions and through which a light through hole for letting through the light emerging from the outlet surface of the prism is formed.

Preferably, in the imaging module for biometrics authentication, the diameter of the light through hole of the housing is set so that a sufficient amount of light necessary for the imaging by the camera module passes through the light through hole.

Preferably, in the imaging module for biometrics authentication, the housing is formed of material absorbing light from near-ultraviolet light to near-infrared light.

Preferably, in the imaging module for biometrics authentication, at least a surface of the housing facing the prism is coated with paint absorbing light from near-ultraviolet light to near-infrared light so that the light emerging from the outlet surface of the prism will not be reflected by the housing to reenter the prism as stray light.

In order to achieve the above object, a housing in accordance with an aspect of the present invention comprises: a holding part for holding a prism, which takes in light emerging from a living body and outputs the light, at a prescribed position; and an attachment part to be used for attaching a camera module, which converts the light from the prism into an electric signal and outputs the electric signal, at a prescribed position of the housing. The attachment part is provided with a light through hole for letting through the light emerging from the prism and letting the light enter the camera module.

In order to achieve the above object, a prism in accordance with an aspect of the present invention comprises: an incidence surface including an incidence area for taking in light emerging from a living body; two or more reflecting surfaces for reflecting the light taken in through the incidence area; and an outlet surface for outputting the light which has been reflected by the reflecting surfaces. A surface other than the incidence surface, the reflecting surfaces or the outlet surface is painted so as to absorb light from near-ultraviolet light to near-infrared light.

In order to achieve the above object, a biometrics authentication apparatus in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; a housing which places the prism and the camera module at prescribed positions and through which a light through hole for letting through the light emerging from the outlet surface of the prism is formed; a recognition unit which recognizes a blood vessel pattern of the living body by analyzing the electric signal outputted by the image pickup device; a storage unit which prestores blood vessel patterns of living bodies; and an authentication unit which executes personal authentication by comparing the blood vessel pattern recognized by the recognition unit with the blood vessel patterns prestored in the storage unit.

In imaging modules for finger authentication, the positioning between the prism and the camera module is highly important since excellent imaging quality can be achieved by an appropriate positional relationship between the two. However, the positioning between the prism and the camera module is becoming more difficult than ever due to the miniaturization and low-profiling of the imaging modules for finger authentication in recent years.

It is therefore another object of the present invention to provide an imaging module for biometrics authentication realizing precise positioning between the prism and the camera module and achieving stable imaging quality with a simple method.

In order to achieve the above object, an imaging module for biometrics authentication in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; and a housing holding the prism at a prescribed position and having an attachment part to which the camera module is attached and fixed at a position corresponding to the outlet surface of the prism. The light emerging from the outlet surface of the prism is focused on the image pickup device of the camera module attached to the housing.

Preferably, in the imaging module for biometrics authentication, the attachment part of the housing is a concavity which engages with a lens tube part containing the lens of the camera module.

Preferably, in the imaging module for biometrics authentication, the camera module further includes a mount having a convexity or concavity for the attachment of the camera module to the attachment part of the housing. The attachment part of the housing has a concavity or convexity which engages with the convexity or concavity of the mount.

In order to achieve the above object, a housing in accordance with an aspect of the present invention comprises: a holding part for holding a prism, which takes in light emerging from a living body and outputs the light, at a prescribed position; and an attachment part to which a camera module, which converts light received by its image pickup device into an electric signal and outputs the electric signal, is attached by engaging the camera module therewith so as to fix the camera module at a position for letting the light from the prism focus on the image pickup device.

Preferably, in the housing, the attachment part is a concavity which engages with a lens tube part containing a lens of the camera module.

Preferably, in the housing, the attachment part is a concavity or convexity which engages with a convexity or concavity formed on a mount of the camera module.

In order to achieve the above object, a camera module in accordance with an aspect of the present invention comprises: a lens for focusing light emerging from a prism taking in light emerging from a living body; an image pickup device for converting the light focused thereon by the lens into an electric signal; and a mount having a convexity or concavity, formed at a prescribed position relative to the lens and the image pickup device, for engaging with an attachment part of a housing so as to place the image pickup device at a position where the light from the prism is focused by the lens on the image pickup device.

In order to achieve the above object, a biometrics authentication apparatus in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a housing holding the prism at a prescribed position and having an attachment part; a camera module which is attached to and engaged with the attachment part of the housing and which includes a lens for focusing the light emerging from the outlet surface of the prism in the state with the camera module attached to the attachment part and an image pickup device for converting the light focused thereon by the lens into an electric signal and outputting the electric signal; a recognition unit which recognizes a blood vessel pattern of the living body by analyzing the electric signal outputted by the image pickup device; a storage unit which prestores blood vessel patterns of living bodies; and an authentication unit which executes personal authentication by comparing the blood vessel pattern recognized by the recognition unit with the blood vessel patterns prestored in the storage unit.

There is still another problem with conventional imaging modules for biometrics authentication. Some of the light emitted by the light source and projected onto the living body is reflected by the surface of the living body and reenter the imaging module as unnecessary light. In such cases, the need for eliminating the unnecessary light makes it difficult to let the camera module successfully detect the light emerging from the living body after traveling (being reflected and dispersed) inside the living body. Further, the amount of light entering the living body decreases compared to the amount of light irradiating the living body due to the reflection at the surface of the living body, by which the amount of the light traveling inside the living body becomes insufficient.

It is therefore another object of the present invention to provide an imaging module for biometrics authentication securing a sufficient amount of light traveling (being reflected and dispersed) inside the living body by preventing the reflection at the surface of the living body.

In order to achieve the above object, an imaging module for biometrics authentication in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; and a housing which holds the prism and the camera module at prescribed positions. The light source is placed so that the light is emitted from the light source in the direction of a normal to the incidence surface of the prism.

Preferably, in the imaging module for biometrics authentication, the light source is placed alongside a surface of the prism other than the incidence surface, the reflecting surfaces or the outlet surface.

Preferably, in the imaging module for biometrics authentication, a field angle of the light source is set at 45 degrees or less.

Preferably, in the imaging module for biometrics authentication, the light source includes an LED (Light Emitting Diode) and a condensing lens.

In order to achieve the above object, a biometrics authentication apparatus in accordance with an aspect of the present invention comprises: a light source irradiating a living body with light capable of passing through the living body; a prism having an incidence surface including an incidence area for taking in light emerging from the living body, two or more reflecting surfaces for reflecting the light taken in through the incidence area, and an outlet surface for outputting the light reflected by the reflecting surfaces; a camera module including a lens for focusing the light emerging from the outlet surface of the prism and an image pickup device for converting the light focused thereon by the lens into an electric signal and outputting the electric signal; a housing which holds the prism and the camera module at prescribed positions; a recognition unit which recognizes a blood vessel pattern of the living body by analyzing the electric signal outputted by the image pickup device; a storage unit which prestores blood vessel patterns of living bodies; and an authentication unit which executes personal authentication by comparing the blood vessel pattern recognized by the recognition unit with the blood vessel patterns prestored in the storage unit. The light source is placed at a position outside a spatial domain formed by extending optical paths connecting the incidence area of the prism and the image pickup device of the camera module. The light source is placed so that the light is emitted from the light source in the direction of a normal to the incidence surface of the prism.

By the present invention, an imaging module for biometrics authentication realizing the miniaturization and low-profiling can be provided.

Other objects, features and advantages of the invention will become apparent from the following description of the embodiments of the invention taken in conjunction with accompanying drawings.

BRIEF DESCRIPTION OF THE DRAWINGS

FIG. 2 is a cross-sectional view of the imaging module of the first embodiment.

FIG. 6 is a cross-sectional view of another imaging module in accordance with the second embodiment, in which an LED is placed behind a first reflecting surface.

DETAILED DESCRIPTION OF THE INVENTION

Embodiment 1

Figure 1:
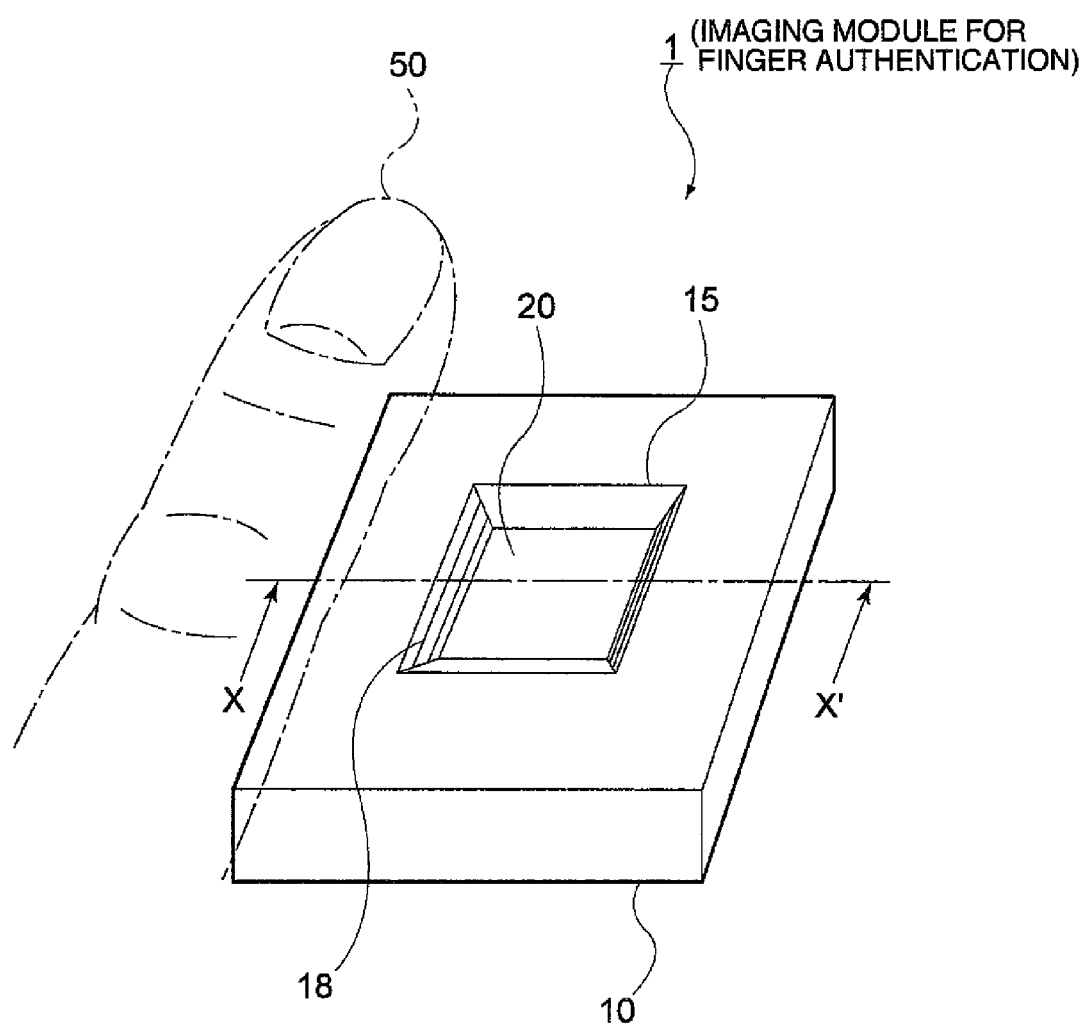
FIG. 1 is an external perspective view of an imaging module for finger authentication in accordance with a first embodiment of the present invention.

Referring now to the drawings, a description will be given in detail of preferred embodiments in accordance with the present invention.

FIG. 1 is an external perspective view of an imaging module for finger authentication (hereinafter referred to simply as an "imaging module 1") as an example of an imaging module for biometrics authentication in accordance with a first embodiment of the present invention. FIG. 2 is a cross-sectional view of the imaging module 1 of the first embodiment.

As shown in FIGS. 1 and 2, the imaging module 1 includes a prism 12, a lens unit 13, an image pickup device 14 and a circuit board 19 which are installed in a housing 10. The housing 10 is equipped with LEDs (Light-Emitting Diodes) 16 (as an example of light sources) and light guides 17.

The housing 10 serves as a cover for surrounding and protecting the whole imaging module 1. The housing 10 has a window part 15 formed at a position corresponding to an incidence area 22a (an area of a surface of the prism 12 (explained later) for taking in near-infrared rays). A black filter 20 for preventing reflection, blocking visible light while letting through infrared light, and protecting the prism 12 is attached to the housing 10 at the bottom of the window part 15. The housing 10 is equipped with the light guides 17 having the LEDs 16 as mentioned above. The housing 10 has irradiation windows 18, through which near-infrared rays emitted by the LEDs 16 are outputted.

The window part 15 of the housing 10, corresponding to the incidence area 22a of the prism 12, is formed to have slanted edges (see FIG. 3B) so that a finger 50 placed on the window part 15 will not be deformed to compress veins inside the finger 50. The slanted edges also serve to prevent the user (subject) from feeling a pain when the finger 50 enters the window part 15 and contacts the edges.

The prism 12 has a substantially rhombic sectional form (pentagonal form) as shown in FIG. 2. However, the sectional form of the prism 12 is not restricted to the form shown in FIG. 2. While an edge of the prism 12 as the boundary between a first reflecting surface 21 and an incidence surface 22 is chamfered in the example of FIG. 2, the prism 12 may also be formed to have a quadrangular sectional form by extending the first reflecting surface 21 and the incidence surface 22 to let them contact with each other. As the material of the prism 12, resin or glass that is transparent to light throughout a wavelength range employed for the finger vein authentication (visible light-near-infrared light (e.g. 500 nm-1200 nm)) is desirable. The material is desired to have a high refractive index from the viewpoint of the miniaturization of the imaging module 1. Resins suitable for the prism 12 include acryl, cycloolefin polymer, acrylic resin, transparent fluoroplastic, transparent polyimide, epoxy resin, styrene-based polymer, polyethylene terephthalate, polypropylene, polyethylene, silicon resin, polyamide-imide, polyarylate, polysulfone containing sulfur, polyether sulfone, etc. Resin containing inorganic particles (e.g. $SiO_2$, $Ta_2O_5$) dispersed therein may also be employed for the prism 12. As the glass material, commonly used optical glass can be employed.

On the incidence surface 22 as a surface of the prism 12 facing the window part 15 of the housing 10, an area upon which the near-infrared rays emerging from the finger 50 are incident (i.e. an area directly facing the window part 15) will be referred to as the "incidence area 22a".

Surfaces of the prism 12 other than the incidence surface 22 will be described later with reference to FIG. 4.

The lens unit 13 is also formed of resin or glass. The lens unit 13 condenses the near-infrared rays after being repeatedly reflected inside the prism 12 (explained later) and thereby focuses the rays on the image pickup device 14 which will be described below. The lens unit 13 includes a band-pass filter (unshown) that selectively lets through near-infrared rays within a specific narrow band (e.g. 800 nm-1200 nm).

The image pickup device 14 is implemented by CCD (Charge Coupled Device) or CMOS (Complementary Metal Oxide Semiconductor), for example. For the miniaturization and low-profiling of the imaging module 1, a VGA module of a size not larger than the ⅐-inch type (preferably, not larger than the 1/7.4-inch type) is desirable. The image pickup device 14 converts the near-infrared rays (focused on its photoreceiving surface (unshown) by the lens unit 13) into an electric signal and outputs the generated electric signal.

Each LED 16 is implemented by an LED (Light Emitting Diode) that emits near-infrared rays capable of penetrating a living body. The LED 16 is suitable as the source of the near-infrared rays since the LED allows for miniaturization, low power consumption and low temperature rise. The wavelength of the near-infrared rays emitted by the LED 16 is desired to be within 800 nm-1000 nm (preferably, within 850 nm-950 nm).

Each light guide 17 is formed of resin (e.g. acryl) that lets through the near-infrared rays emitted by the LED 16. As the material of the light guide 17, the aforementioned materials (resin, glass) or various combinations of the materials may be used.

Figure 3A:
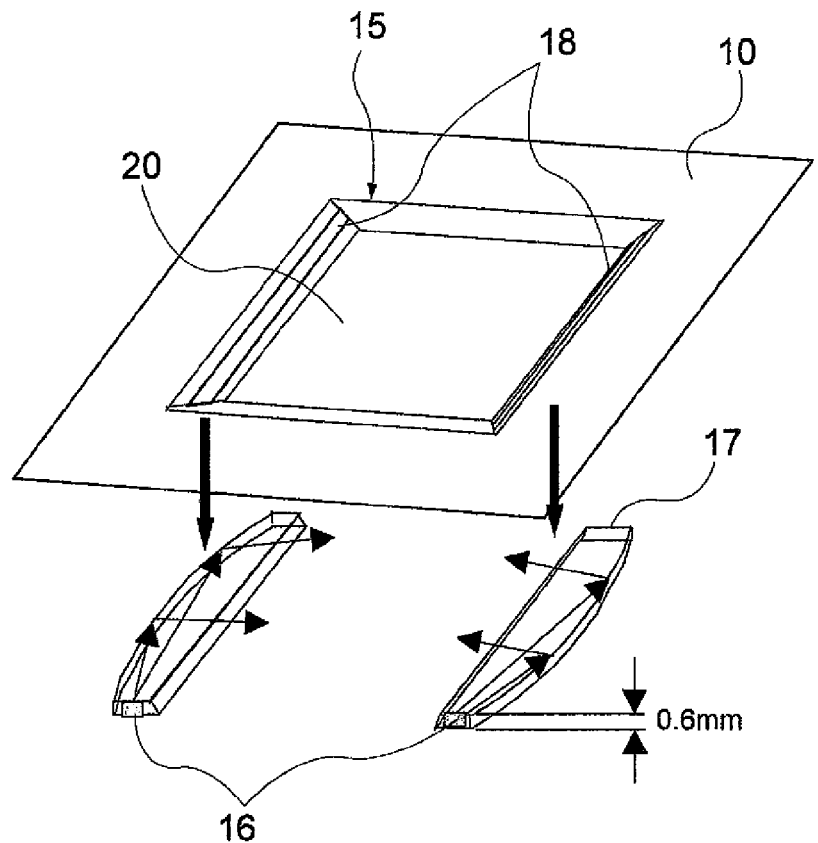
FIGS. 3A and 3B are schematic diagrams for explaining near-infrared irradiation by use of light guides of the imaging module of the first embodiment.
Figure 3B:
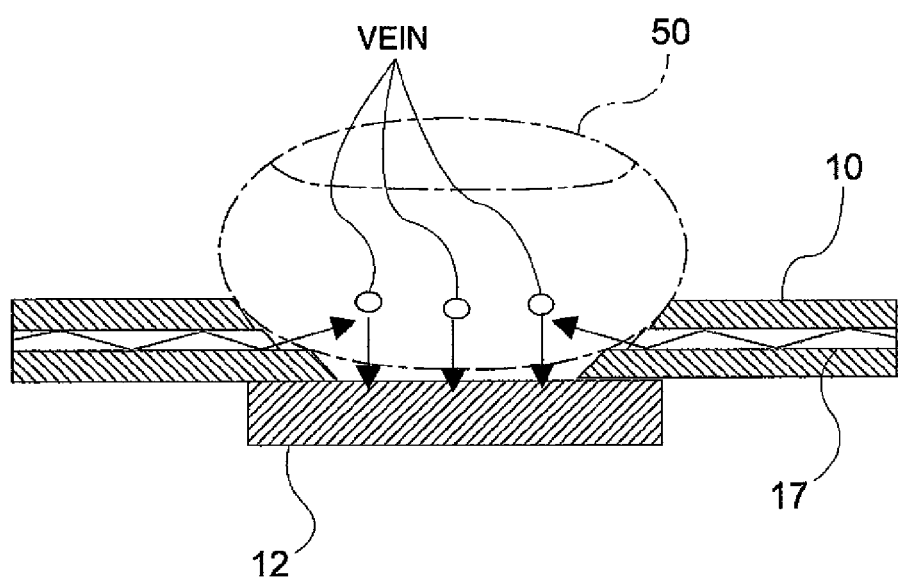

FIGS. 3A and 3B are schematic diagrams for explaining the near-infrared irradiation by use of the light guides 17, wherein FIG. 3A shows the light guides 17 being attached to the housing 10.

As shown in FIG. 3A, each LED 16 is placed at an end of a corresponding light guide 17. Each light guide 17 is attached to the housing 10 while letting its emitting surface face a corresponding irradiation window 18 so that the near-infrared rays from the LED 16 can be outputted through the irradiation window 18. The near-infrared rays emitted by the LED 16 are reflected by a curved back surface of the light guide 17, emitted through the emitting surface of the light guide 17, and outputted to the window part 15 through the irradiation window 18.

FIG. 3B is a cross-sectional view for explaining the arrangement around the window part 15 when the finger 50 is irradiated with the near-infrared rays.

As shown in FIG. 3B, the emitting surface of each light guide 17 is facing obliquely upward, that is, facing the inner part of the finger 50. Thus, the near-infrared rays emitted through the emitting surface of the light guide 17 travel toward the inner part of the finger 50, by which veins within approximately 3 mm of the skin of the finger 50 can be irradiated with the near-infrared rays.

At the irradiation window 18 of the housing 10, a cover of each light guide 17 on the prism side (lower cover) protrudes from the emitting surface of the light guide 17, by which the near-infrared rays emitted from the light guide 17 are prevented from directly entering the prism 12. Incidentally, while the circuit board 19 is installed in (attached to) the imaging module 1 of this embodiment as shown in FIG. 2, the circuit board 19 may be placed outside the imaging module 1 (e.g. installed in a device to which the imaging module 1 is attached).

Returning to FIG. 2, electronic parts mounted on the circuit board 19 include a signal processing unit 25 (see FIG. 13) for executing signal processing (noise reduction, signal correction, etc.) to the electric signal outputted by the image pickup device 14 and a recognition unit 26 (see FIG. 13) for recognizing the vein pattern of the finger 50 (by analyzing the image signal processed by the signal processing unit 25) and outputting the result of the vein pattern recognition. The circuit board 19 outputs the vein pattern (which has been acquired based on the electric signal outputted by the image pickup device 14) to the outside. The process will be explained in more detail later referring to a block diagram of FIG. 13. Incidentally, the electronic parts that should be mounted on the circuit board 19 are placed outside an area of the circuit board 19 contacting a third reflecting surface 23 of the prism 12.

The optical configuration of the imaging module 1 configured as above will be described below referring to figures.

Figure 4:
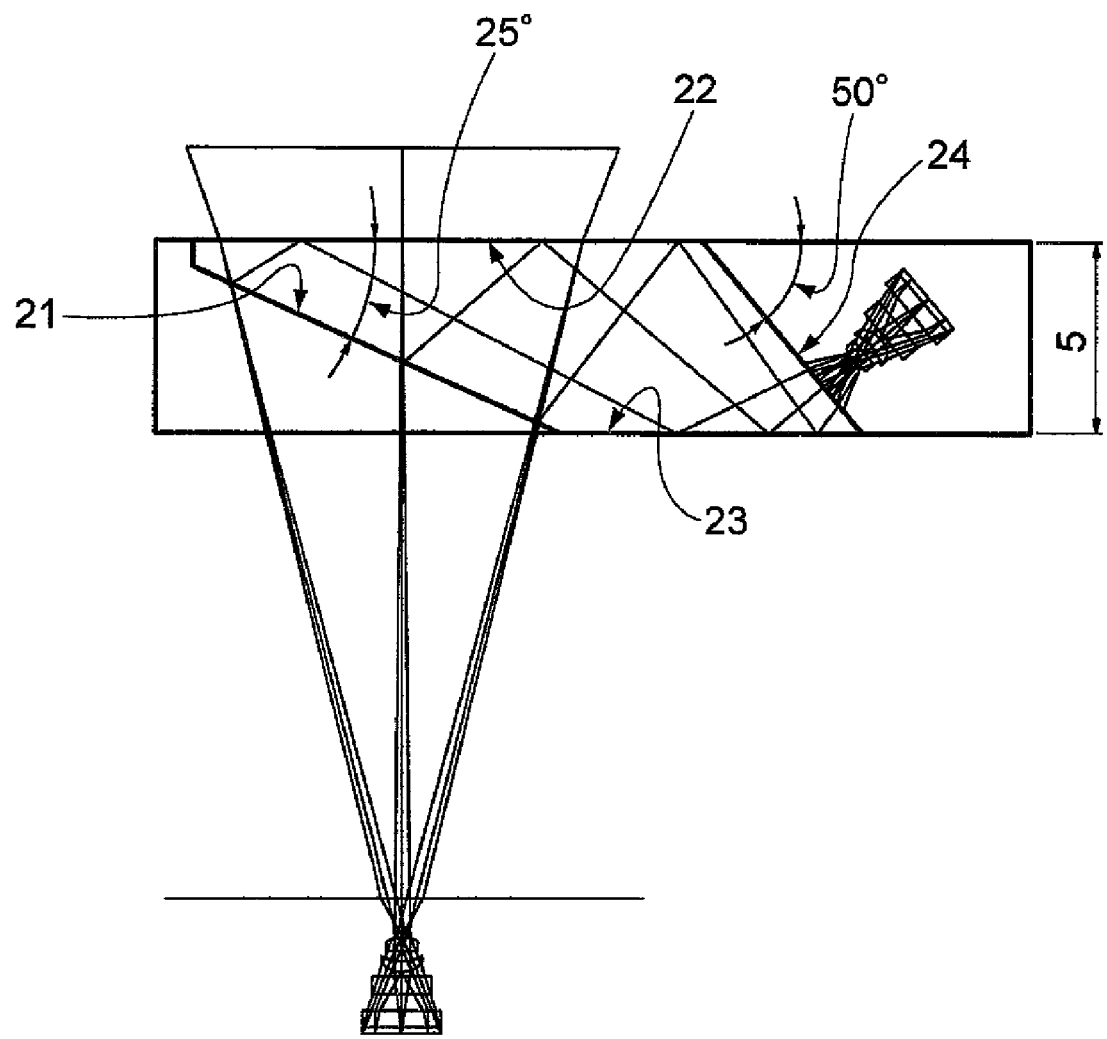
FIG. 4 is a schematic diagram for explaining the optical configuration of the imaging module of the first embodiment.

FIG. 4 is a schematic diagram for explaining the optical configuration of the imaging module 1 of this embodiment.

The near-infrared rays emitted by the LEDs 16 and outputted through the light guides 17 and the irradiation windows 18 are reflected and diffused inside the finger 50, and some of the near-infrared rays reenter the imaging module 1 through the window part 15.

The near-infrared rays entering the prism 12 via the filter 20 and the incidence area 22a (directly facing the window part 15) of the incidence surface 22 of the prism 12 are first incident upon the first reflecting surface 21 opposite to the incidence surface 22. The first reflecting surface 21 is coated with a metal reflective layer by vapor deposition (e.g. aluminum evaporation), by which the incident near-infrared rays are reflected.

As shown in FIG. 4, the near-infrared rays after being reflected by the first reflecting surface 21 return to the incidence surface 22 including the incidence area 22a. Each near-infrared ray reflected by the first reflecting surface 21 is incident upon the incidence surface 22 at a prescribed incident angle with respect to the direction of the normal to the incidence surface 22. The incidence surface 22, serving also as a reflecting surface at this stage, will be referred to also as a "second reflecting surface 22".

Differently from the other area of the second reflecting surface 22, the incidence area 22a is coated with no reflective layer (e.g. metal evaporation layer) in order to ensure the transparency to the near-infrared rays. Meanwhile, the other area of the second reflecting surface 22 (other than the incidence area 22a), which is hidden behind the housing 10, is not required to let through the near-infrared rays. Further, the incident angle gets smaller as the distance from the first reflecting surface 21 increases. Thus, the area other than the incidence area 22a is coated with a reflective layer. As the reflective layer, a metal reflective layer (Al, Ag, Al alloy, Ag alloy, Cu, Au, etc.), a reflective layer made up of a stack of transparent dielectric layers having different refractive indices, etc. can be employed.

The near-infrared rays incident upon the incidence area 22a of the second reflecting surface 22 after being reflected by the first reflecting surface 21 are totally reflected by the incidence area 22a (total reflection) according to the relationship between the refractive index of the prism 12 and the incident angle upon the second reflecting surface 22. Meanwhile, the near-infrared rays incident upon the other area of the second reflecting surface 22 (other than the incidence area 22a) are necessarily reflected by the reflective layer even when the incident angle in the area does not satisfy the condition for the total reflection. The near-infrared rays reflected by the second reflecting surface 22 as above travel toward the third reflecting surface 23 opposite to the second reflecting surface 22.

The third reflecting surface 23 is coated with a metal reflective layer similarly to the first reflecting surface 21, by which the incident near-infrared rays are reflected and deflected toward an outlet surface 24 of the prism 12. The near-infrared rays travel perpendicularly to the outlet surface 24, penetrate the outlet surface 24, and thereafter travel toward the lens unit 13. The near-infrared rays are condensed by the lens unit 13 to focus on the image pickup device 14. Incidentally, while the outlet surface 24 in this embodiment is not coated with a reflective layer, an area of the outlet surface 24 not for letting through the near-infrared rays may be coated with a reflective layer so as to prevent unnecessary light from entering the prism 12.

Surfaces of the prism 12 other than the incidence surface 22 (second reflecting surface 22), the first reflecting surface 21, the third reflecting surface 23 or the outlet surface 24 (hereinafter referred to as "lateral surfaces") are coated with paint so that light from the near-ultraviolet region to the near-infrared region are absorbed by the coating. The lateral surfaces are desired to be painted so as to absorb light from the near-ultraviolet region to the near-infrared region, for example. Specifically, the coating (paint) on the lateral surfaces is desired to absorb wavelength components of light that are used for the biometrics authentication (finger authentication). In this embodiment, a coating absorbing light from the visible region to the near-infrared region is desirable since the LEDs 16 emitting near-infrared light or visible light are employed as the light sources.

Inside the finger 50, living tissues having transparency to near-infrared rays (e.g. muscular tissues and bones) let through or disperse the near-infrared rays. On the other hand, blood vessels (containing blood having hemoglobins, etc. absorbing near-infrared rays) absorb the near-infrared rays. Therefore, in the image focused on the image pickup device 14, the blood vessels are described as dark parts while the other tissues are described as bright parts. The image pickup device 14 converts the focused image into an electric signal and outputs the obtained electric signal to the circuit board 19.

As described above, in the imaging module 1 in accordance with the first embodiment of the present invention, the prism 12 is formed to have two or more reflecting surfaces and the near-infrared rays entering the prism 12 are reflected twice or more inside the prism 12. Since the arrangement of the two or more reflecting surfaces is strictly determined by the shape of the prism 12, the arrangement of the reflecting surfaces can be set more precisely within a smaller size compared to cases where the near-infrared rays are reflected by use of two or more mirrors. With this configuration, the miniaturization and low-profiling of the imaging module 1 is realized. Basically, on each reflecting surface, an area incapable of total reflection due to the relationship with the incident angle is coated with a reflective layer.

By this embodiment, a low-profile imaging module 1 can be realized since a long optical path can be folded twice or more and arranged inside a thin prism 12 installed in the imaging module 1. In the first embodiment (in which the distance between an edge of the window part 15 and the back of the image pickup device 14 is approximately 25 mm), the folding of the long optical path was attained by a prism 12 as thin as 5 mm when the angle between the incidence surface 22 and the first reflecting surface 21 was 25 degrees and the supplement of the angle between the incidence surface 22 and the outlet surface 24 was 50 degrees as shown in FIG. 4.

With the imaging module 1 of this embodiment, the thickness of the module (including the housing 10 and the circuit board 19) was successfully reduced to less than 10 mm (when the size of the window part 15 was approximately 20 mm×20 mm) while also realizing low optical distortion (0.7% that is ≦2%). At the position of a vein of the finger 50, a great depth of field (≧1 mm) and a high resolution (30 μm) were achieved.

The folding and arrangement of the long optical path inside the prism 12 is realized in this embodiment by the use of the incidence surface 22 (including the incidence area 22a having transparency to the near-infrared rays) also as the second reflecting surface 22.

Further, since the incidence area 22a of the second reflecting surface 22 is designed to totally reflect the near-infrared rays incident from the inside of the prism 12, the incidence area 22a can also be used as a reflecting surface (second reflecting surface 22) while ensuring its transparency to the near-infrared rays entering the prism 12 from outside.

Furthermore, the reflection of the near-infrared rays by the second reflecting surface 22 including the incidence area 22a is secured by forming the reflective layer on the area of the second reflecting surface 22 (having the incidence area 22a) in which total reflection is originally unavailable.

Embodiment 2

FIGS. 5A through 8 are schematic diagrams showing imaging modules in accordance with a second embodiment of the present invention.

Figure 5A:
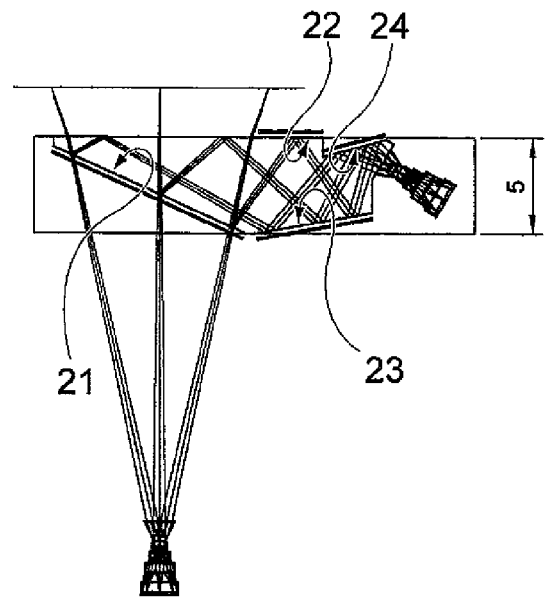
FIGS. 5A through 5C are schematic diagrams showing the optical configurations of imaging modules in accordance with a second embodiment of the present invention.

The imaging module 1 shown in FIG. 5A differs from that in the first embodiment (see FIG. 4) in that the near-infrared rays are reflected four times inside the prism 12.

The distance (optical path) from the incidence area 22a to the back of the image pickup device 14 is folded up and arranged inside the prism 12 (approximately 5 mm thick) by three reflections in the imaging module 1 of FIG. 4, whereas the folding of the optical path is implemented by four reflections in the example shown in FIG. 5A (first example).

Figure 5B:
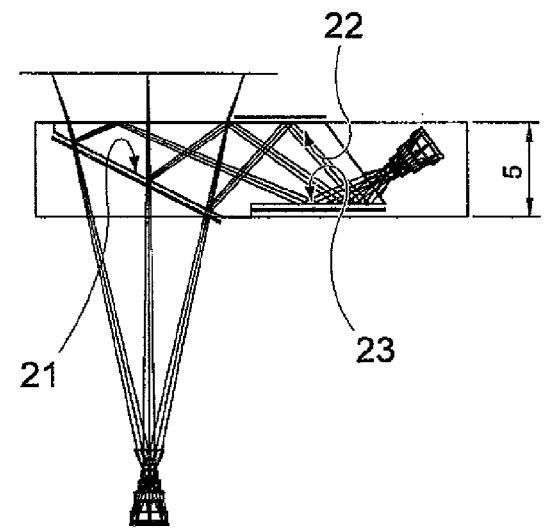

The imaging module 1 shown in FIG. 5B differs from that in the first embodiment (FIG. 4) in that the third reflecting surface 23 is placed closer to the second reflecting surface 22. In the example shown in FIG. 5B (second example), the optical path is folded up and arranged inside a prism 12 (approximately 5 mm thick) by three reflections.

Figure 5C:
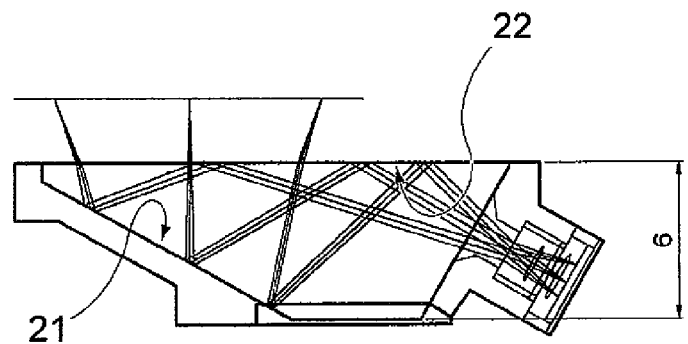

The imaging module 1 shown in FIG. 5C differs from that in the first embodiment (FIG. 4) in that the near-infrared rays are reflected twice inside the prism 12. In the example shown in FIG. 5C (third example), the optical path is folded up and arranged inside a prism 12 that is approximately 6 mm thick by two reflections.

FIG. 6 is a cross-sectional view of another imaging module 30 in accordance with the second embodiment, in which an LED 16 is placed behind the first reflecting surface 21 of the imaging module 1 of the first embodiment (FIG. 2).

In the imaging module 30 of FIG. 6, an area of the first reflecting surface 21 capable of total reflection is not coated with a metal reflective layer so that the near-infrared rays emitted by the LED 16 can pass through the first reflecting surface 21. The reflective layer is formed by vapor deposition only in the other area of the first reflecting surface 21 in which total reflection is impossible. Specifically, an area of the first reflecting surface 21 in the vicinity of the incidence area 22a is the total reflection area where no reflective layer (by vapor deposition) is formed. In the imaging module 1 of the first embodiment (FIG. 2) in which the finger 50 is irradiated with near-infrared rays from right and left sides, the light amount of near-infrared rays can be insufficient around the center line of the finger 50. On the other hands the imaging module 30 of FIG. 6 almost squarely irradiating the finger 50 with near-infrared rays can eliminate the problem (insufficient light amount around the center line of the finger 50).

Figure 7:
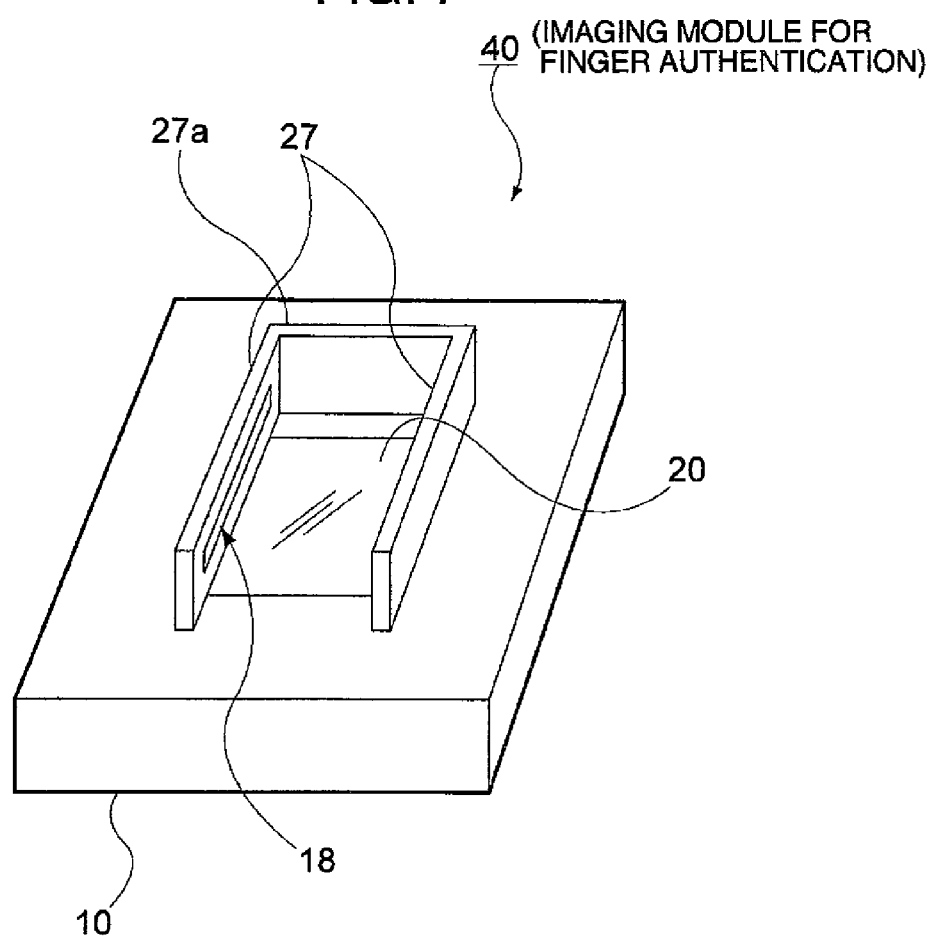
FIG. 7 is a schematic diagram showing another imaging module in accordance with the second embodiment, which is equipped with finger guides for regulating the finger.

FIG. 7 is a schematic diagram showing another imaging module 40 in accordance with the second embodiment, which is equipped with finger guides 27 for regulating lateral parts of the finger 50 and a finger guide 27a for regulating the tip of the finger 50. Although the finger guide 27a is not necessarily essential, the finger 50 can be regulated more precisely and the accuracy of the vein pattern recognition can be increased by use of the finger guide 27a.

The imaging module 40 of FIG. 7 helps the user (subject) to intuitively recognize where to place his/her finger 50, as well as blocking external light from entering the finger 50 at low angles. Further, by providing the finger guides 27 with irradiation windows 18 as shown in FIG. 7, veins that should be scanned and imaged (veins within a prescribed depth (e.g. approximately 3 mm) of the skin of the finger 50) can be irradiated with near-infrared rays more efficiently and the whole finger 50 can be irradiated more evenly in comparison with the imaging module 1 of the first embodiment (see FIGS. 1 and 2).

Figure 8:
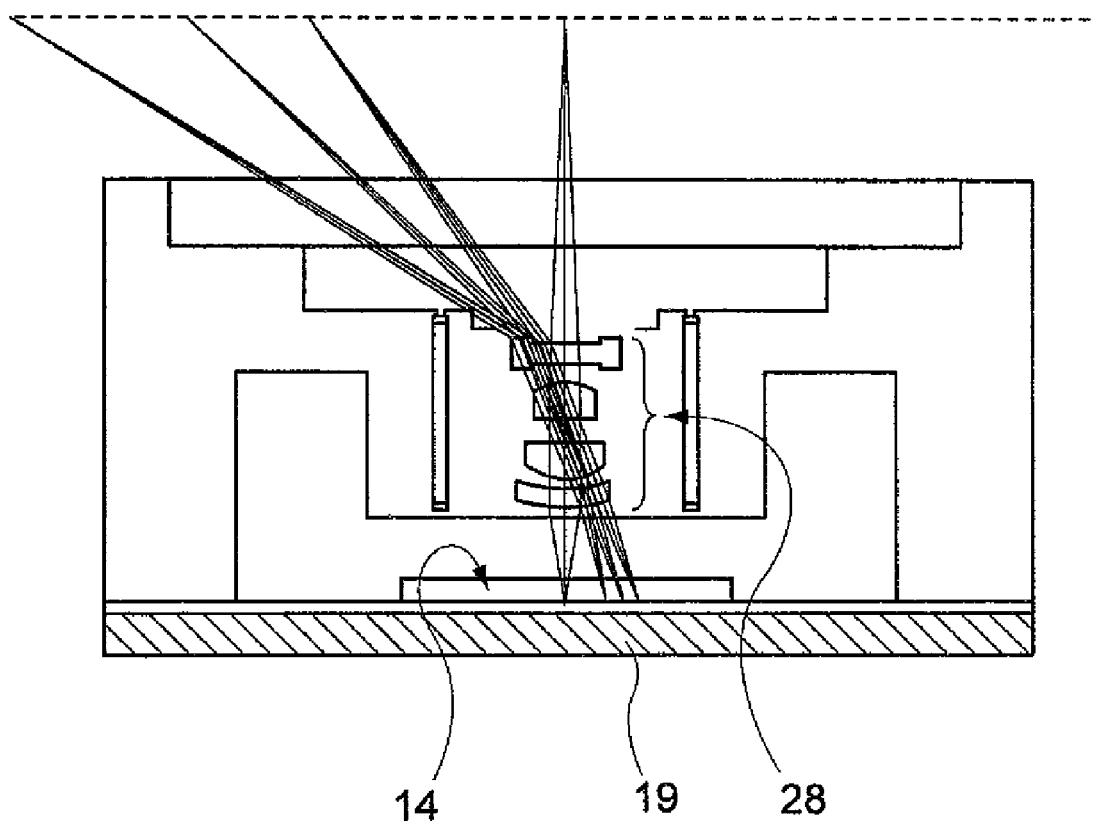
FIG. 8 is a schematic diagram showing another imaging module in accordance with the second embodiment, in which near-infrared rays are focused on an image pickup device by a wide-angle lens unit.

FIG. 8 is a schematic diagram showing another imaging module in accordance with the second embodiment, in which the near-infrared rays are focused on the image pickup device 14 by a wide-angle lens unit 28 only, without using the prism. The imaging module of FIG. 8, as an example of low-profiling without using a prism, has an advantage of a wide angle of view. Also with this configuration, the thickness of the whole imaging module was reduced to less than 7 mm.

Further, it is also possible to configure a telecentric optical system (unshown) by forming a Fresnel lens on the top surface (facing the finger 50) of the filter 20 shown in FIG. 2. By letting the near-infrared rays enter the prism 12 as substantially parallel rays, changes in the size of the image (vein pattern) can be kept to a minimum even if the object (finger 50) moved up and down, by which the image processing can be simplified. While the Fresnel lens unit can not be formed on the surface of the prism 12 facing the window part 15 (since the surface has to be used also as a total reflection surface), the Fresnel lens unit can be formed on the filter 20, without hindering the total reflection inside the prism 12.

Incidentally, while all the reflecting surfaces of the prism 12 are formed as plane surfaces in the above embodiments, some of the reflecting surfaces may be formed as curved surfaces (unshown). Such a configuration makes it possible to leave out the lens unit 13 and further miniaturize the imaging module.

Embodiment 3

FIGS. 9 through 12 are schematic diagram showing imaging modules in accordance with a third embodiment of the present invention.

In an imaging module 30 shown in FIGS. 9 through 11B, the prism 12 and a camera module 33 are held by a housing 31. On lateral faces of the housing 31, LEDs 34a-34f (as an example of light sources) are placed.

Figure 11A:
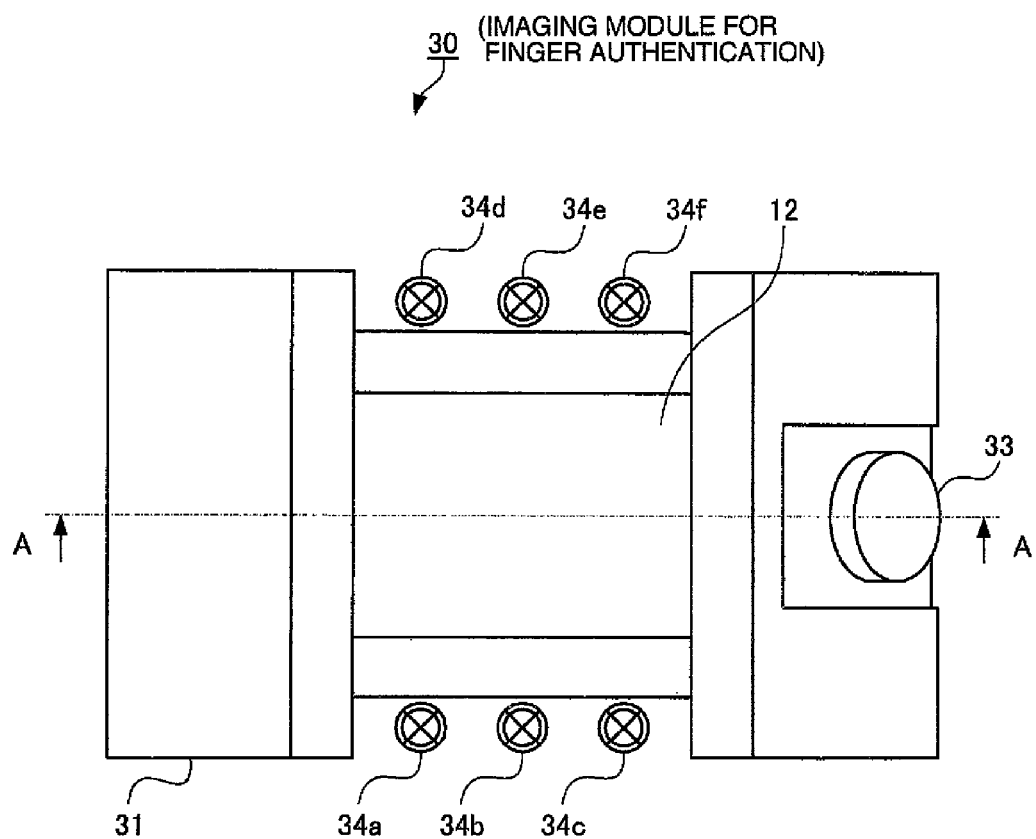
FIGS. 11A and 11B are a top view and a cross-sectional view of the imaging module of FIG. 9.
Figure 11B:
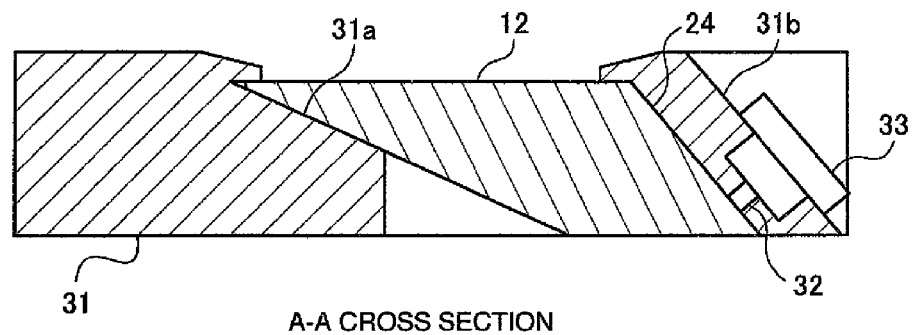

The housing 31 is formed of resin (e.g. black polycarbonate) by molding. The housing 31 holds the prism 12 in its holding part 31a as shown in FIG. 11B. A concavity (to which the camera module 33 is attached) is formed in an attachment part 31b of the housing 31 facing the outlet surface 24 of the prism 12. The housing 31 is desired to be made of material absorbing light from the near-ultraviolet region to the near-infrared region, for example. Specifically, materials absorbing wavelength components of light used for the biometrics authentication (finger authentication) are desirable for the housing 31. In this embodiment, materials absorbing light from the visible region to the near-infrared region are desirable since the LEDs 34a-34f emitting near-infrared light or visible light are employed as the light sources.

Incidentally, the inner surface (facing the prism 12) of the holding part 31a for holding the prism 12 may be painted so that the rays emerging from the outlet surface 24 of the prism 12 will not be reflected by the housing 31 to reenter the prism 12 as stray light (unnecessary light). Also in this case where the housing 31 is painted, the paint is desired to absorb light from the near-ultraviolet region to the near-infrared region, for example. Specifically, the paint is desired to absorb wavelength components of light that are used for the biometrics authentication (finger authentication). In this embodiment, paint absorbing light from the visible region to the near-infrared region is desirable since the LEDs 34a-34f emitting near-infrared light or visible light are employed as the light sources.

By fitting the prism 12 in the holding part 31a of the housing 31, the prism 12 is held at a prescribed position in the housing 31. The positioning between the prism 12 and the camera module 33 is completed by attaching the camera module 33 to the concavity of the attachment part 31b of the housing 31.

The attachment part 31b of the housing 31 has a circular light through hole 32 for letting through light. The light through hole 32, formed to be concentric with the concavity of the attachment part 31b, lets through the rays emerging from the outlet surface 24 of the prism 12 and lets the rays enter the camera module 33. The diameter of the light through hole 32 is set suitably so that a sufficient amount of light (necessary for the imaging by the camera module 33) passes through the light through hole 32, by which stray light (unnecessary light) entering the camera module 33 from the prism 12 is reduced. Specifically, in cases where the optical system of the camera module 33 has a front aperture configuration, setting the diameter of the light through hole 32 at that of the front aperture required for the imaging makes it possible to let the light through hole 32 reduce the amount of rays (emerging from the outlet surface 24) to that necessary for the imaging. With this configuration, the front aperture can be left out from the camera module 33. When the camera module 33 is equipped with a front aperture (unshown), an aperture adjustment function of the camera module 33 is made possible by setting the diameter of the light through hole 32 larger than the maximum diameter of the front aperture.

Figure 9:
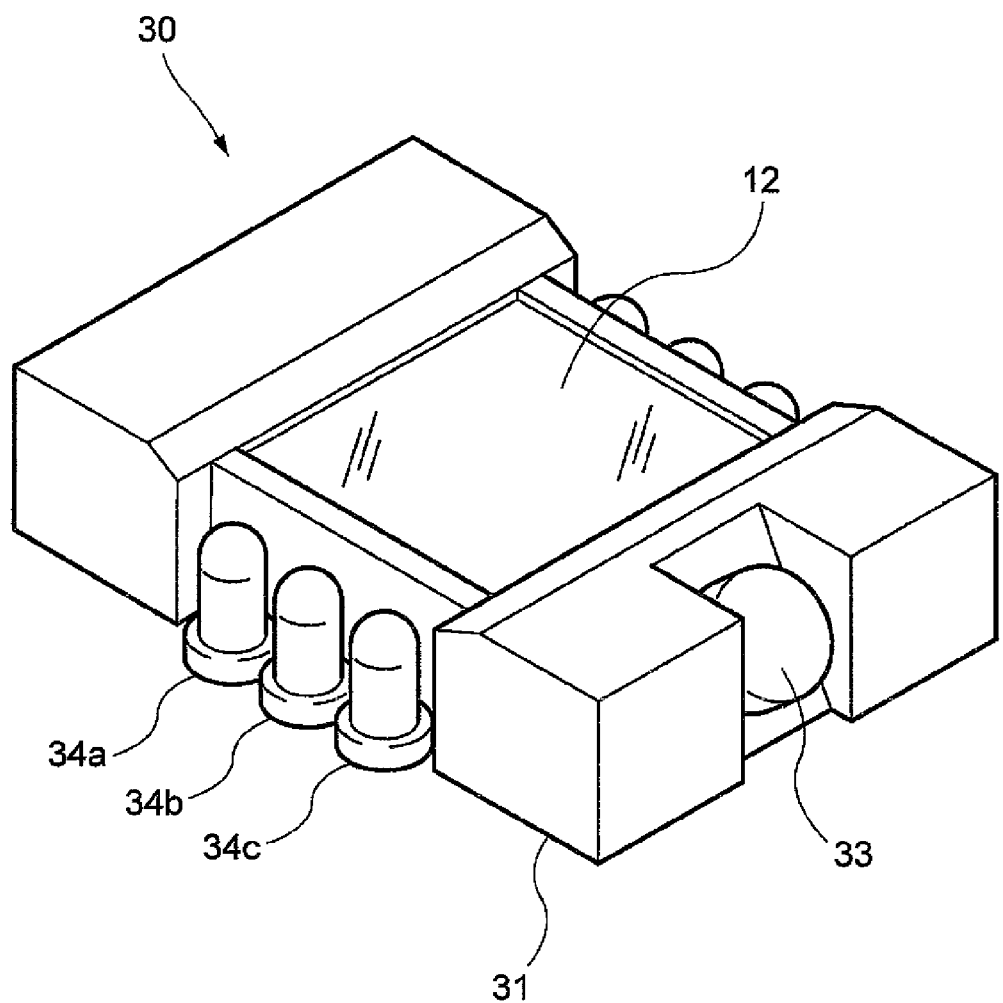
FIG. 9 is an external perspective view of an imaging module in accordance with a third embodiment of the present invention.
Figure 10:
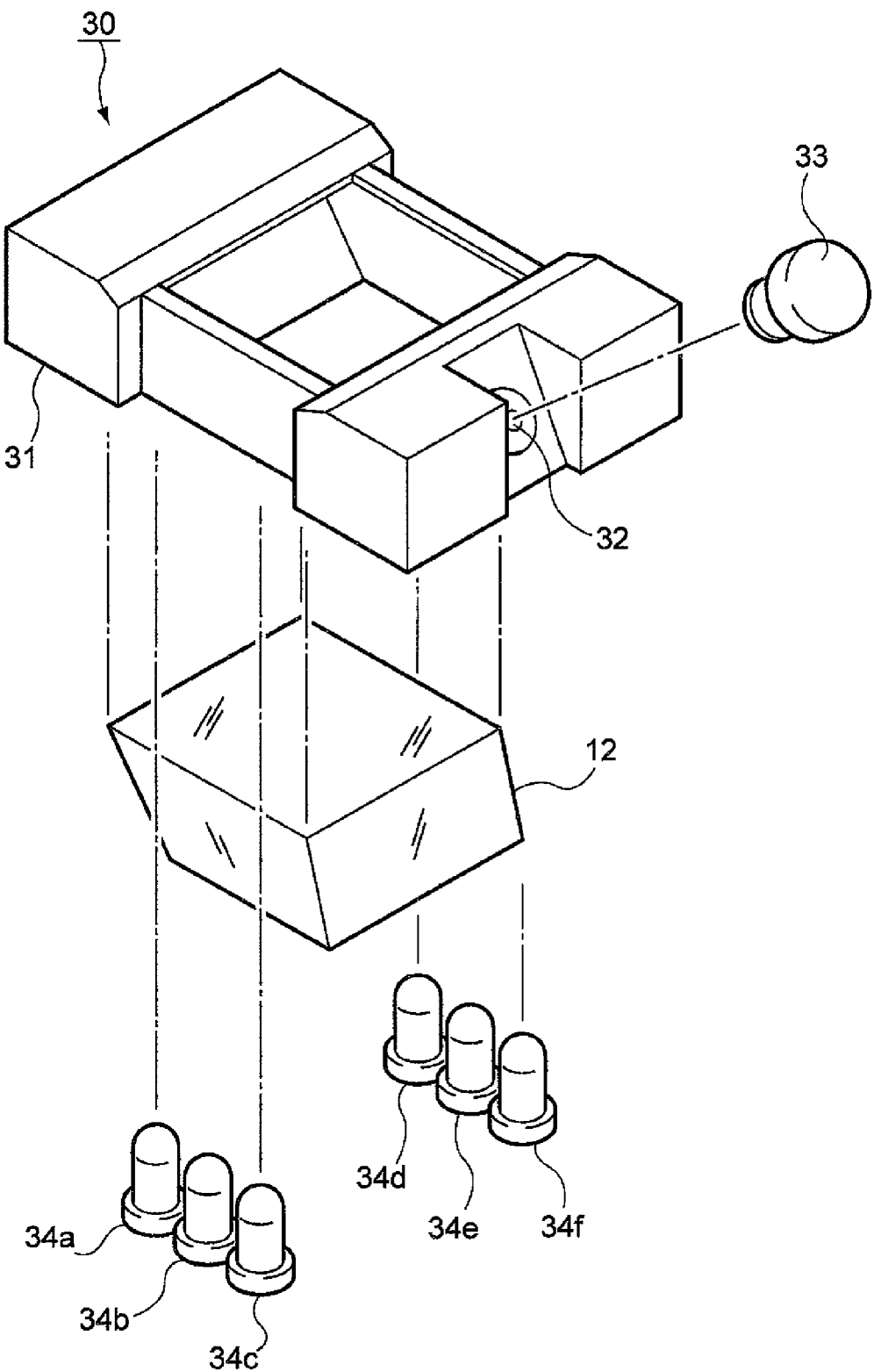
FIG. 10 is an exploded view of the imaging module of FIG. 9.

The LEDs 34a-34f, having the same performance as the LEDs 16 shown in FIG. 2, are implemented by light-emitting diodes emitting near-infrared light or visible light capable of penetrating a living body. The LEDs 34a-34f are placed at positions outside a spatial domain formed by extending the optical paths (unshown) connecting the incidence area 22a (see FIG. 2) of the prism 12 and the image pickup device 14 (see FIG. 2) of the camera module 33. For example, the LEDs 34a-34f are placed alongside the lateral surfaces of the prism 12 (other than the incidence surface 22, the first reflecting surface 21, the third reflecting surface 23 or the outlet surface 24 shown in FIG. 2) as shown in FIG. 9.

The LEDs 34a-34f are desired to have high directivity. For example, the field angle (half-value total angle: angular range within which light emission intensity is half the peak value (center value) or more) of each LED 34a-34f is desired to be 45 degrees or less. Preferably, the field angle is set at 30 degrees or less. However, even LEDs having low directivity can be used for the LEDs 34a-34f, by combining the LEDs with condensing lenses.

The LEDs 34a-34f emit rays in the direction of the normal to the incidence surface 22 of the prism 12. Therefore, the rays emitted by the LEDs 34a-34f are incident upon the living body (finger 50) substantially at right angles, by which reflection of the rays at the surface of the living body can be reduced. Incidentally, it is possible to further employ light guide tubes (unshown) in order to project the rays onto the living body substantially at right angles. The use of the light guide tubes can relax restrictions on the arrangement of the LEDs.

Figure 12A:
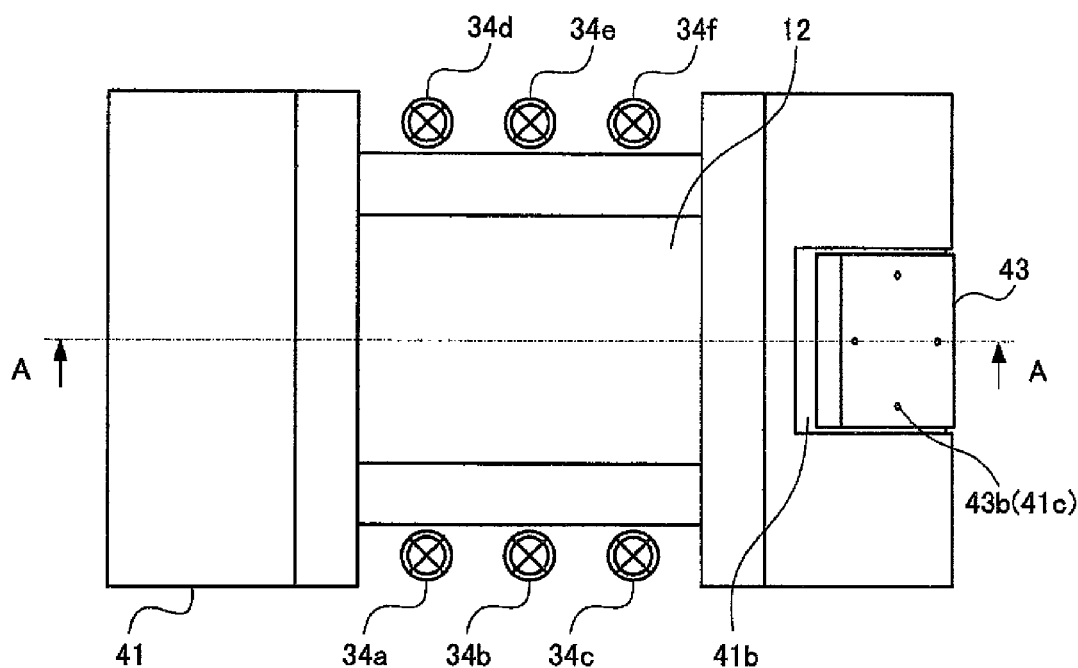
FIGS. 12A and 12B are a top view and a cross-sectional view of another imaging module in accordance with the third embodiment.
Figure 12B:
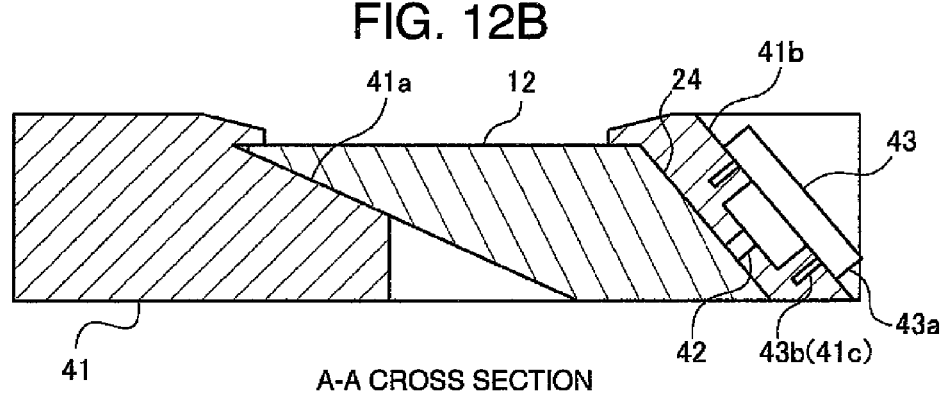

FIGS. 12A and 12B are a top view and a cross-sectional view of another imaging module 40 in accordance with the third embodiment. Also in this imaging module 40, the prism 12 and a camera module 43 are held by a housing 41. The imaging module 40 of FIGS. 12A and 12B differs from the imaging module 30 of FIGS. 11A and 11B (in which the camera module 33 is fitted into and fixed to the concavity formed in the attachment part 31b of the housing 31) in that the camera module 43 is attached and fixed to the housing 41 by fitting convexities 43b formed on a mount 43a of the camera module 43 into concavities 41c formed in an attachment part 41b of the housing 41.

The housing 41 holds the prism 12 in its holding part 41a as shown in FIG. 12B. Two or more concavities 41c are formed in the attachment part 41b of the housing 41 in order to firmly fix the camera module 43 at a prescribed position. A light through hole 42 for letting through light is formed through the attachment part 41b of the housing 41 similarly to the light through hole 32 shown in FIG. 11B.

Embodiment 4

In the following, a finger authentication apparatus 100 equipped with the aforementioned imaging module 1 will be described referring to FIG. 13. While the imaging module 1 described in the first embodiment is employed for the finger authentication apparatus 100 in this embodiment, the finger authentication apparatus 100 may also be implemented with other imaging modules described in the previous embodiments.

Figure 13:
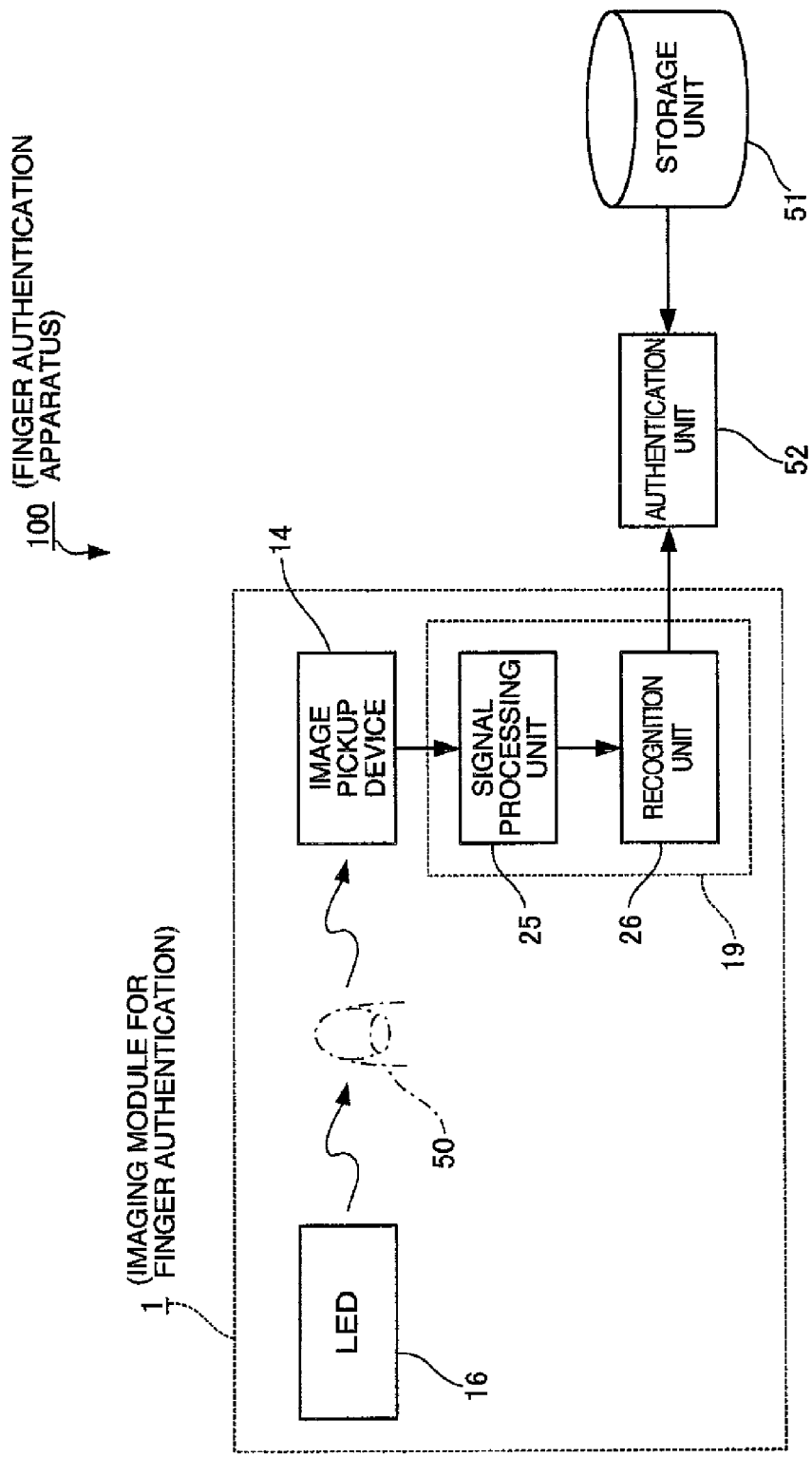
FIG. 13 is a block diagram showing the overall composition of a finger authentication apparatus (equipped with the imaging module of the first embodiment) in accordance with a fourth embodiment of the present invention.

FIG. 13 is a block diagram showing the overall composition of the finger authentication apparatus 100 as an example of a biometrics authentication apparatus in accordance with a fourth embodiment of the present invention. The finger authentication apparatus 100 can be used for the personal authentication of users of a personal device such as a notebook PC.

As shown in FIG. 13, the finger authentication apparatus 100 of this embodiment includes the imaging module 1, a storage unit 51 which prestores vein patterns, and an authentication unit 52 which executes the personal authentication by comparing a vein pattern recognized by the recognition unit 26 (explained later) with the vein patterns prestored in the storage unit 51. The imaging module 1 includes LEDs 16 for emitting near-infrared rays for the irradiation of the finger 50 of the user (subject), the image pickup device 14 for capturing the near-infrared rays emerging from the finger 50, the signal processing unit 25 for executing signal processing to the electric signal outputted by the image pickup device 14, and the recognition unit 26 for recognizing the vein pattern of the finger 50 based on the image signal processed by the signal processing unit 25.

The signal processing unit 25, connected to the image pickup device 14 and the recognition unit 26, executes the signal processing (noise reduction, signal correction, etc.) to the electric signal outputted by the image pickup device 14 and supplies the result of the signal processing (image signal) to the recognition unit 26.

The recognition unit 26 recognizes the vein pattern of the finger 50 by analyzing the image signal processed by the signal processing unit 25 and outputs the recognized vein pattern to the authentication unit 52.

The storage unit 51 is connected to the authentication unit 52. The storage unit 51, prestoring a plurality of vein patterns previously captured by the imaging module 1, supplies the stored vein patterns to the authentication unit 52 in response to instructions from the authentication unit 52 which will be explained below. When a vein pattern of a finger 50 of a person is newly captured and recognized by the recognition unit 26 of the imaging module 1, the storage unit 51 acquires the new vein pattern from the recognition unit 26 and stores the vein pattern therein while associating it with personal information on the person.

The authentication unit 52 is connected to the recognition unit 26 and the storage unit 51. The authentication unit 52 executes the personal authentication by comparing the vein pattern of the finger 50 captured and recognized by the imaging module 1 with the vein patterns prestored in the storage unit 51.

Next, the biometrics authentication method carried out by the finger authentication apparatus 100 will be described below.

After the finger 50 of a user (subject) is placed on the imaging module 1, the finger 50 is irradiated with the near-infrared rays emitted by the LEDs 16. Some of the near-infrared rays entering and being dispersed inside the finger 50 enter the prism 12 of the imaging module 1 via the window part 15.

The near-infrared rays entering the prism 12 are reflected inside the prism 12 and thereafter focused on the image pickup device 14 via the outlet surface 24 and the lens unit 13. The image pickup device 14 generates the electric signal based on the image focused thereon and outputs the electric signal to the circuit board 19.

On the circuit board 19 receiving the electric signal, the signal processing unit 25 generates the image signal by executing noise reduction, signal correction, etc. to the electric signal. Subsequently, the recognition unit 26 on the circuit board 19 recognizes (generates) the vein pattern inside the finger 50 based on the image signal generated by the signal processing unit 25 and outputs the generated vein pattern to the authentication unit 52 connected to the imaging module 1. The vein pattern inside the finger 50 is captured and outputted by the imaging module 1 as above.

The authentication unit 52 acquiring the vein pattern from the imaging module 1 executes the personal authentication by comparing the acquired vein pattern with the vein patterns prestored in the storage unit 51. The biometrics authentication is carried out by the finger authentication apparatus 100 as above.

As described above, the finger authentication apparatus 100 of this embodiment carries out the personal authentication based on the vein pattern which is outputted by the sufficiently miniaturized and low-profiled imaging module 1. Therefore, the miniaturization and low-profiling of the finger authentication apparatus 100 can be realized.

Incidentally, while the present invention has been applied to finger authentication (using a vein pattern of a finger 50) in the above embodiments as an example of biometrics authentication, the present invention is also applicable to other types of biometrics authentication such as palm authentication, forehead blood vessel authentication, etc.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. An imaging module for biometrics authentication, comprising:
   a light source irradiating a living body with light capable of passing through the living body;
   a prism having an incidence surface including an incidence area for taking in light emerging from the living body, two or more reflecting surfaces for reflecting the light taken in through the incidence area, and an outlet surface for outputting the light reflected by the reflecting surfaces; and
   a camera module including a lens for focusing the light emerging from the outlet surface of the prism and an image pickup device for converting the light focused thereon by the lens into an electric signal and outputting the electric signal, wherein the prism is configured so that the light taken in through the incidence area and reflected by a first reflecting surface is reflected by the incidence surface including the incidence area by using the incidence surface also as a second reflecting surface.

2. The imaging module for biometrics authentication according to claim 1, wherein the prism is configured so that the light taken in through the incidence area and reflected by the first reflecting surface is reflected by total reflection in an area of the second reflecting surface including at least the incidence area.

3. The imaging module for biometrics authentication according to claim 1, wherein the prism is configured so that the light reflected by the second reflecting surface is reflected by a third reflecting surface placed opposite to the second reflecting surface and thereafter emerges from the prism through the outlet surface.

4. The imaging module for biometrics authentication according to claim 1, wherein:
   the first reflecting surface of the prism includes a total reflection area which reflects the light taken in through the incidence area by total reflection and a reflective layer formation area which reflects the light taken in through the incidence area by a reflective layer formed on the surface of the prism, and
   the light source irradiates the living body with the light capable of passing through the living body via the total reflection area and the incidence area.

5. The imaging module for biometrics authentication according to claim 1, further comprising a filter which blocks visible light.

6. The imaging module for biometrics authentication according to claim 5, wherein a Fresnel lens is formed on the filter.

* * * * *

UNITED STATES PATENT AND TRADEMARK OFFICE
CERTIFICATE OF CORRECTION

PATENT NO. : 8,027,519 B2
APPLICATION NO. : 11/955114
DATED : September 27, 2011
INVENTOR(S) : Tsuyoshi Maro et al.

It is certified that error appears in the above-identified patent and that said Letters Patent is hereby corrected as shown below:

ON THE TITLE PAGE:

Item (73), Assignee should read

--(73) Assignee: Hitachi Maxell, Ltd., Ibaraki-Shi, Osaka (JP)--.

Signed and Sealed this
Tenth Day of January, 2012

David J. Kappos
*Director of the United States Patent and Trademark Office*